United States Patent [19] [11] 3,895,318
Ross [45] July 15, 1975

[54] CATV MULTI-TAP DISTRIBUTION BOX WITH SWITCH

[76] Inventor: Joseph I. Ross, 5 Ridge Rock Ln., East Norwich, N.Y. 11732

[22] Filed: July 17, 1974

[21] Appl. No.: 489,096

Related U.S. Application Data

[63] Continuation-in-part of Ser. No. 471,659, May 20, 1974.

[52] U.S. Cl. .................... 333/6; 200/51.1
[51] Int. Cl. .................... H03h 7/48
[58] Field of Search .................... 333/6–9; 200/51.1

[56] References Cited

UNITED STATES PATENTS

| | | | |
|---|---|---|---|
| 3,523,212 | 8/1970 | Murphy | 200/51.1 X |
| 3,525,056 | 8/1970 | Qurashi | 333/8 X |
| 3,617,811 | 11/1971 | McVoy | 333/9 X |

*Primary Examiner*—Paul L. Gensler

[57] ABSTRACT

A multi-tap distribution box for a cable television system, the box being interposed in a distribution line carrying audio and video signals and/or other electrically conducted data as well as power to and from subscribers who are interconnected to the distribution line by means of secondary lines (drops) coupled to taps on said distribution box. The box consists of a housing having input and output ports, and a tap plate having a distribution network mounted on its inner face. The network is connected to a group of taps projecting from the outer face, means being provided to connect the network to the input and output ports when the tap plate is in place and to disconnect the network from the ports when said tap plate is removed from housing. The housing contains a normally-closed switch which is activated by the tap plate whereby audio, video and other data as well as a power are passed through the switch when the tap plate is removed and are routed through the network when the tap plate is in place.

5 Claims, 5 Drawing Figures

CATV MULTI-TAP DISTRIBUTION BOX WITH SWITCH

RELATED APPLICATION

This application is a continuation-in-part of the copending application Ser. No. 471,659 filed May 20, 1974 for "CATV MULTI-TAP DISTRIBUTION BOX."

BACKGROUND OF THE INVENTION

This invention relates generally to multi-tap distribution boxes for a cable television system, and more particularly to an improved box for this purpose.

In a cable television system (CATV) a network in the form of coaxial cables serves to distribute television and radio signals as well as other electronic data from a master station or other point in the system to homes, offices, and other facilities of subscribers in the community being served. Distribution boxes are installed at numerous points along the cable so that connections can be made from the subscriber to the distribution cable. At least one connection is required for each subscriber served. The multi-tap boxes provided for this purpose are in some instances placed in outdoor or underground lines or installed indoors. Drop lines from the taps on the distribution boxes act to carry signals to and/or from the subscribers. The distribution line also functions to conduct power to the various signal amplifiers to maintain signal at a proper level. Since the audiovideo and data signals are in the high-frequency range, they will hereafter be referred to as R-F signals, as distinguished from low-frequency A-C power for energizing cable amplifiers in the CATV network.

The standard multi-tap box consists of a device in which provision is made for permanently installing the device into a CATV distribution system. The device includes means whereby A-C power and R-F signals are conveyed through and distributed to the various taps provided therein for connection to subscribers without provision for the separation of the distribution function from that of conveying A-C power or R-F signals when the distributive tap function is unnecessary.

The standard "Entron" multi-tap (SMT) is constituted by a housing having an open well and a removable tap plate which seals the housing, the tap plate being provided with a circuit board that is accommodated within the well. Disposed in the well of the housing is an R-F blocking inductor whose ends are connected to pins extending from the coaxial input and output ports at the opposite ends of the housing. When installed, the box is interposed in the primary CATV line through the input and output ports thereof. The inductor interconnecting the ports offers a high impedance to the passage of R-F signals between the upstream and downstream sides of the line, but it presents no significant impedance to the low-frequency A-C power currents carried by the line to energize the line amplifiers. Thus the blocking inductor acts to block only R-F signals, and not the flow of power.

The circuit board is provided with connecting clips which when the board is in place within the housing well, are adapted to engage the pins. These clips or connectors are connected on the circuit board to a distribution circuit which includes a series network that shunts the inductor and transfers the R-F signals between the input and output ports, and a tapping network connected to the series network for directing a portion of the signal to a set of external taps on the tap plate.

When therefore the tap plate is properly secured to the housing, R-F signals on the primary line are distributed to the set of taps, the signals at the same time being conducted downstream to the other SMT boxes and amplifiers on the downstream side of the primary line, but when the tap plate is removed during periods of maintenance, the R-F signals are interrupted by the R-F blocking inductor and there is a loss of signal in the downstream boxes and amplifiers. Only A-C power is maintained downstream without interruption.

The use of standard SMT boxes such as the box disclosed in U.S. Pat. No. 3,675,181 has a serious drawback, for the loss of R-F signal which results when a tap plate is removed, cuts off signal reception at the downstream distribution points.

But the greatest practical objection to existing types of CATV multi-tap boxes is economic, for such boxes add substantially to the cost of constructing a dedicated CATV system. A dedicated CATV system is one in which the multi-tap boxes are made a part of the system at the time of construction. The number and spacing of the boxes on the primary line are determined by taking into account the existing demand for services and the projected future need therefor. Thus the usual dedicated system is designed to provide taps for all current and potential subscribers, or a projection of 100% saturation. As a consequence the owner of a dedicated CATV system in a sense must also dedicate his construction costs, for the owner is required to make an initial investment to take care of potential subscribers, some of whom may never enlist.

The reason why a dedicated CATV system is preferred over prior methods of construction, despite their high initial costs, is that the system affords signals of better quality and permits the addition of new subscribers without disturbing those already tapped into the cable. Nevertheless the technical advantages are in large measure offset by economic drawbacks.

SUMMARY OF THE INVENTION

In view of the foregoing, it is the main object of this invention to provide a CATV multi-tap signal distribution box whose housing contains only those elements necessary for signal and power integrity and whose removable tap plate includes only those elements essential to signal distribution.

A salient feature of the invention is that for purposes of constructing a dedicated CATV system, the owner need only install the relatively inexpensive housings in the primary line, for these housings are adapted to convey both signal and power. The more costly tap plate need be purchased and installed by the owner of the system only when required to add paying subscribers to the system.

Thus the initial construction cost of a dedicated system including multi-tap boxes in accordance with the invention, is far below existing costs, without any loss in the technical advantages gained by the system.

More particularly, it is an object of the invention to provide an SMT distribution box for a dedicated CATV system which box includes a housing and a removable tap plate, the housing having an R-F blocking inductor which is normally short-circuited to convey R-F signals between the input and output ports thereof in the absence of the tap plate, the tap plate when installed acting to actuate the switch and remove the short circuit whereby the R-F signals are then supplied to the taps.

Briefly stated these objects are attained in a multitap signal distribution box formed by a housing which is provided with a normally-closed switch which shunts and short-circuits an R-F blocking inductor connecting the input to the output port to conduct both power and signal. Removably secured to the housing is a tap plate having means to engage and open the switch, the plate being provided with a distribution circuit which is coupled to said ports and is rendered operative when said switch is open, to supply said signal to a group of taps.

OUTLINE OF THE DRAWING

For a better understanding of the invention as well as other objects and features thereof, reference is made to the following detailed description to be used in conjunction with the annexed drawing, wherein.

DESCRIPTION OF THE INVENTION

Figure 1:
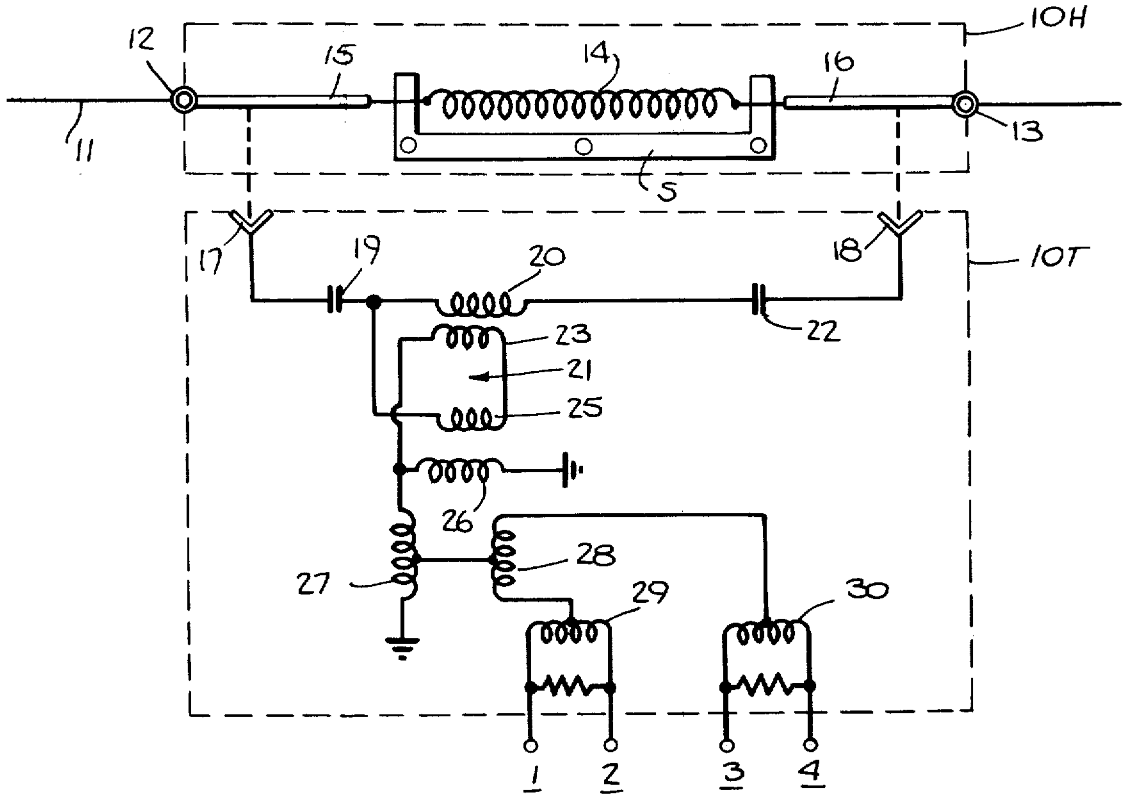
FIG. 1 is a schematic circuit of an SMT distribution box having a shorting switch in accordance with the invention.

Referring now to FIG. 1, there is shown the schematic diagram of a multi-tap distribution box in accordance with the invention, the box differing from a standard box only by reason of a normally-closed switch S. The box is formed by a housing 10H and tap plate 10T associated therewith. The box is interposed in a primary line 11 or coaxial cable of a CATV system, the housing having an input port 12 and an output port 13 for connection to the cable. The section of the primary line connected to the input port is on the upstream side and that connected to the output port is on the downstream side. The tap plate is provided with a set of external taps 1, 2, 3 and 4 which are connectable to subscribers by means of secondary or drop lines provided with suitable couplers. In practice, a greater or smaller number of taps may be provided to meet system requirements.

Disposed within an open well in housing 10H is an R-F blocking inductor 14 whose ends are connected to the free ends of axially-aligned rigid roll pins 15 and 16 extending from input port 12 and output port 13, respectively. The blocking inductor presents a high impedance to R-F signals carried by the primary line and serves therefore to block the passage of these signals without impeding the flow of low-frequency A-C power.

Tap plate 10T is provided with a circuit board that fits into the housing well containing the blocking inductor. Mounted on the circuit board are connectors 17 and 18 which when the circuit board is inserted in the well, engage rigid pins 15 and 16. Connected between connectors 17 and 18 is a series network formed by capacitor 19, the first primary coil 20 of a directional coupler 21 and a capacitor 22. The parameters of this series network are such as to afford a relatively low-impedance R-F path which by-passes the high impedance blocking inductor to convey the R-F signals from the upstream input port to the downstream output port. Thus when the tap plate is secured to the housing, blocking inductor 14 is by-passed by the series network to convey R-F signals down the primary line to the other SMT boxes and amplifiers in the CATV system.

Directional coupler 21 acts to divert signals from the series network to the taps leading to the subscribers' T-V sets, while preventing signals originating at these sets, such as the local oscillator signal, from being transferred to the primary line, for such local signals if conveyed on the primary line will produce interference. The coupler includes two phased transformers, the primary 20 of the first transformer being included in the series network and the secondary 23 thereof being connected at one end to ground through a signal-splitting coil 27. The primary 25 of the second transformer of the directional coupler is connected between the other end of secondary 23 of the first transformer and the junctions of capacitor 19 and the primary 20. The secondary 26 of the second transformer is connected between ground and the junction of secondary 23 and coil 27.

Signal-splitting coil 27 of the distribution network is connected at its center tap to a circuit tree composed of coils 28, 29 and 30 leading to taps 1, 2, 3 and 4. It is to be understood that the distribution circuit shown is merely illustrative and that other known circuit configurations have been used in connection with the taps.

In prior art SMT box arrangements, the connectors 17 and 18 are disengaged from pins 15 and 16 when tap plate 10T is withdrawn from housing 10H, causing an interruption in the flow of R-F signals between the upstream and downstream side of the primary line.

In the present invention, switch S which is normally shunted across blocking inductor 14 acts to short circuit this inductor, thereby interconnecting the input and output ports in the housing. When however the tap plate is installed, the circuit board thereof acts to break open switch S.

Thus in the open state of the box, the switch S therein is closed to short-circuit the inductor to conduct R-F signals and power currents and thereby maintain a direct connection between the upstream and downstream sides of the primary line, in contradistinction to prior art arrangements wherein R-F signal transmission is interrupted in the open-box state. In the closed-box state the switch is held open by the circuit board of the tap plate and power currents are transmitted through the blocking inductor while R-F signals are transmitted through the series network shunting the inductor, this being true also in the prior art arrangement.

Figure 2:
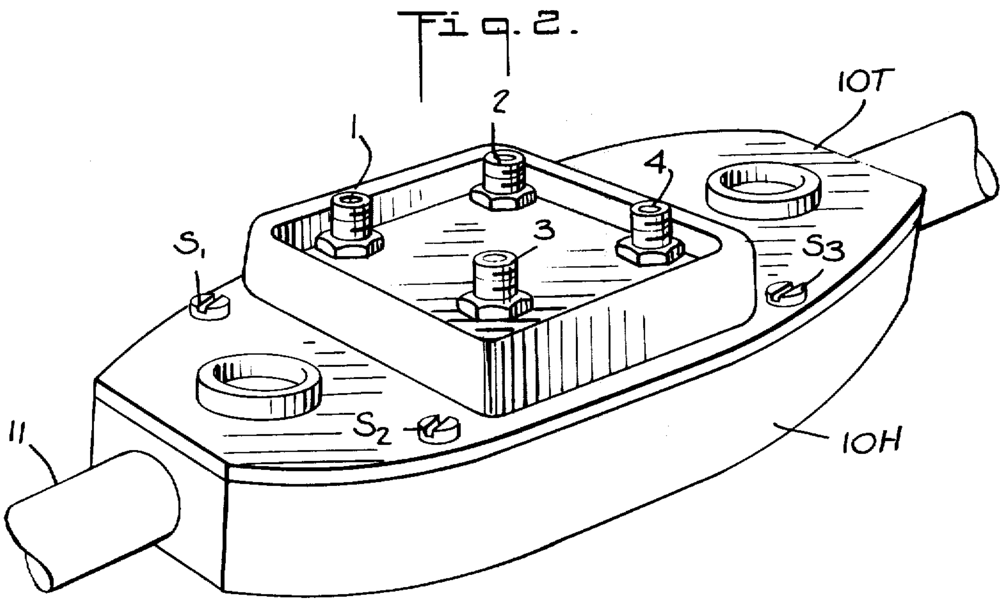
FIG. 2 is a perspective view of an SMT distribution box in accordance with the invention.
Figure 3:
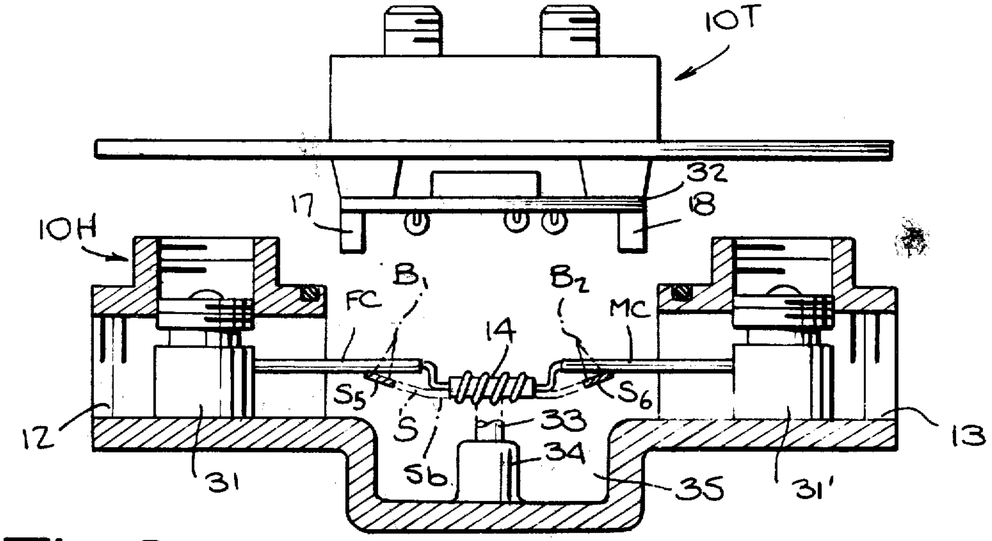
FIG. 3 is a longitudinal section taken through FIG. 2.

Referring now to FIGS. 2 and 3, the actual structure of an SMT distribution box in accordance with the invention is illustrated. The tap plate 10T is secured to the housing by four captive screws $S_1$, $S_2$, $S_3$ and $S_4$ (not shown). The contact pins FC and MC extend from seizing elements 31 and 31' which are received in ports 12 and 13. Each seizing element, includes an axial inlet and a lateral inlet whereby the primary line coupling to the box may be axial or at right angles thereto. The circuit board 32 which is mounted on the underside of tap plate 10T carries the circuit components illustrated in FIG. 1 as well as connecting clips or connectors 17 and 18.

Figure 4:
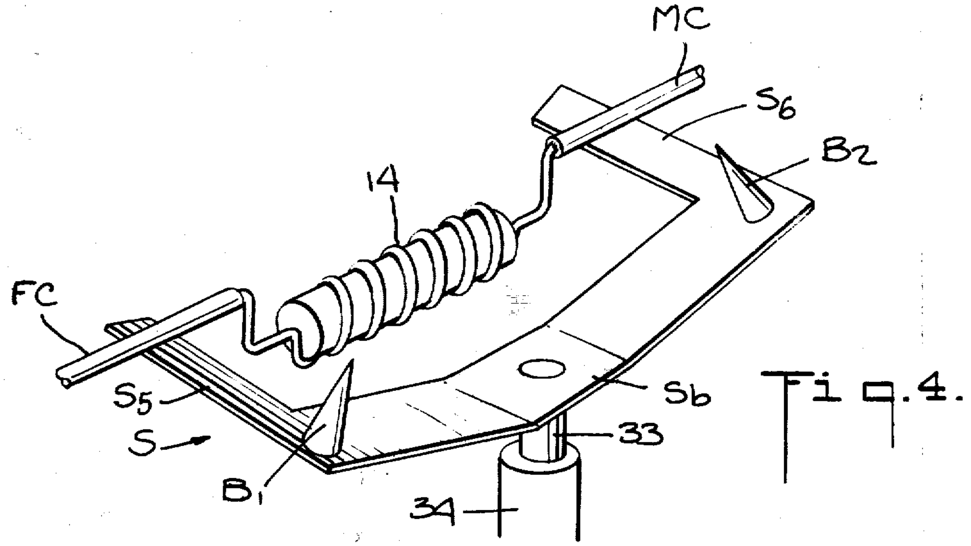
FIG. 4 is a perspective view showing only the switch and its associated R-F blocking inductor.

As shown in FIGS. 3 and 4, switch S is formed by a U-shaped flat piece of spring metal of good electrical conductivity, to define a base $S_b$ and a pair of spring fingers $S_5$ and $S_8$ extending laterally from the ends of the base. The piece is mounted in horizontal plane, with base $S_b$ thereof parallel to inductor 14 and fingers $S_5$ and $S_8$ projecting below contact pins FC and MC at right angles thereto. The fingers are normally biased to engage contact pins FC and MC whereby the switch piece is shunted across and shorts out inductor 14.

The spring is held in place by means of an insulating pillar 33 attached to the center of base $S_b$ and anchored in a pedestal 34 formed in the well 35 of housing 10H.

Figure 5:
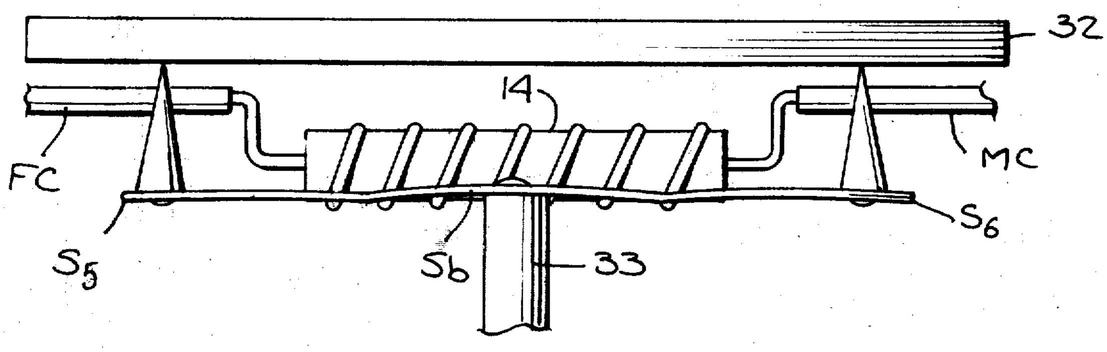
FIG. 5 shows how the circuit board on the tap plate acts to actuate the switch.

Conical insulating buttons $B_1$ and $B_2$ are attached to the respective ends of base $S_b$ to serve as switch actuators. The tips of these buttons, as shown in FIG. 5, are pressed down by circuit board 32 of the plate 10T when this plate is installed on the housing, as a consequence of which fingers $S_5$ and $S_8$ are deflected to lift the short circuit from the inductor. At the same time connectors 17 and 18 engage pins FC and MC, so that now the input and output ports are connected to the tap distribution network to supply the R-F signal to the taps. The inductor which is now operative, serves to block R-F flow between the input and output ports, while passing power currents.

Thus the owner of a dedicated CATV system even before he has enlisted subscribers at various points along the line, may install at these points only the housings of SMT boxes but without tap plates, the installed housings containing the closed switches which maintain signal and power integrity. When subscribers are available at a given point, the owner can then purchase and install a tap plate on the housing. The owner need not go through the expense of buying tap plates until this expense is warranted. In order to seal off housings, before tap plates are installed, a blank cover (not shown) may be used to seal the housing and to protect the components therein.

While there has been shown a preferred embodiment of the invention, it will be appreciated that many changes may be made therein without departing from the essential operation thereof. Thus the invention is not limited to the particular form of switch shown in the housing, and other types of switches may be used to intercouple the input and output ports. Nor is it necessary that the switch actuator be operated by the movement of the circuit board, for the board or any other component on tap plate may be provided with a suitable element to open the switch and lift the short thereacross.

I claim:

1. A multi-tap distribution box for a community antenna system, said box being interposable in a primary line carrying high-frequency signals and power currents to subscribers who are linked to the primary line by secondary lines coupled to taps on the box, said box comprising:

A. a housing having an input port and an output port for interposing said box in the primary line, a radio-frequency blocking inductor disposed in said housing to interconnect said ports, and a normally-closed switch shunting said inductor and short-circuiting same, and B. a tap plate removably secured to said housing, said tap plate having a group of external taps, means engaging said switch to break open same, a distribution network coupled between said ports when said plate is secured to said housing to supply said signals to said taps, said network being rendered operative only when said switch is open.

2. A box as set forth in claim 1, wherein said means engaging said switch is the circuit board on which said network is mounted.

3. A box as set forth in claim 1, wherein said primary line is a coaxial cable and said ports have an axial inlet and a lateral inlet whereby said cable may be axially coupled to said port or at right angles thereto.

4. A multi-tap distribution box for a community antenna system, said box being interposed in a primary line carrying high-frequency signals and power currents to subscribers who are linked to the primary line by secondary lines coupled to taps on the box, said box comprising:

A. an open housing having an input port and an output port for interposing the box in the primary line and leads of a radio-frequency blocking inductor connected between said ports, B. a switch disposed in said open housing, said switch being normally closed and shunted across said leads to short out said inductor, said switch having actuator means, and C. a removable tap plate secured to said housing to seal same, said plate having external taps and being provided with a circuit board on which is mounted a pair of connectors adapted to engage the leads of said ports, said board engaging the actuator means of said switch to break open said switch, and a distribution network mounted on said board and coupled to said connectors to supply a portion of said signals to said taps whereby when said tap plate is removed from said housing, said switch closes to convey both said signals and said power currents between said ports and when said tap plate is secured to said housing, said switch opens and said signals are supplied to said taps.

5. A box as set forth in claim 4, wherein said switch is constituted by a U-shaped member formed of spring metal, the resilient arms of said switch namely engaging said leads to short out said conductor, said fingers having raised insulating buttons mounted thereon which are engaged by said circuit board to deflect said fingers and thereby open said switch.

* * * * *